(12) United States Patent
Bonfield

(10) Patent No.: US 9,165,474 B1
(45) Date of Patent: Oct. 20, 2015

(54) SYSTEM AND METHOD FOR LIMITING COMPUTER USAGE

(75) Inventor: Teri J. Bonfield, Harrison, OH (US)

(73) Assignee: Teri J. Bonfield, Harrison, OH (US)

( * ) Notice: Subject to any disclaimer, the term of this patent is extended or adjusted under 35 U.S.C. 154(b) by 531 days.

(21) Appl. No.: 12/582,361

(22) Filed: Oct. 20, 2009

Related U.S. Application Data

(60) Provisional application No. 61/107,097, filed on Oct. 21, 2008.

(51) Int. Cl.
*G09B 3/00* (2006.01)
*G09B 7/00* (2006.01)

(52) U.S. Cl.
CPC ........................................ *G09B 7/00* (2013.01)

(58) Field of Classification Search
CPC .................................. G09B 7/00; G06F 21/00
USPC .................................. 434/236, 323, 350, 362
See application file for complete search history.

(56) References Cited

U.S. PATENT DOCUMENTS

| | | | |
|---|---|---|---|
| 5,035,625 A | 7/1991 | Munson et al. | |
| 5,716,273 A | 2/1998 | Yuen | |
| 5,743,743 A * | 4/1998 | Ho et al. | 434/236 |
| 6,024,572 A | 2/2000 | Weyer | |
| 6,678,824 B1 | 1/2004 | Cannon et al. | |
| 6,688,888 B1 | 2/2004 | Ho et al. | |
| 7,036,145 B1 | 4/2006 | Murphy et al. | |
| 7,287,224 B2 * | 10/2007 | Beam, III | 715/709 |
| 8,010,037 B2 * | 8/2011 | Bannwolf et al. | 434/350 |
| 2003/0077559 A1 | 4/2003 | Braunberger et al. | |
| 2004/0081953 A1 * | 4/2004 | Murphy | 434/350 |
| 2004/0241633 A1 | 12/2004 | Drozda | |

* cited by examiner

*Primary Examiner* — Peter Egloff

(57) ABSTRACT

The present invention involves a system and method for limiting access to computers by an individual; and a system and method for rewarding an individual with computer access.

26 Claims, 2 Drawing Sheets

SYSTEM AND METHOD FOR LIMITING COMPUTER USAGE

CROSS-REFERENCE TO RELATED APPLICATION

The present application claims priority to provisional U.S. Patent Application No. 61/107,097 as filed Oct. 21, 2008.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to a means of limiting computer usage by an individual, and more generally relates to a system and method for rewarding an individual's use of a computer.

2. Description of the Related Art

The use and prevalence of computers, video game consoles, television, personal digital devices, mobile telephones, and the like has grown significantly in the past several decades. Such use and prevalence has correspondingly grown with younger individuals.

Although the use of computing devices has increased among younger individuals, such use is not always for learning, and may in fact actually decrease the amount of time an individual expends on learning, studying, and completing homework. Further, typically using such computing devices decreases the amount of time younger individuals devote to physical activity.

Parents and guardians of younger individuals often must spend more time at work, running errands, and the like. As such, parents and guardians are often unable to monitor the amount of time a younger individual may spend "playing" on the computing device. As a consequence, the younger individual may decrease the amount of time that should be devoted to actually studying or exercising.

Parents and guardians may limit access to use of a computing device via password protection on the computing device, physically barring use of the respective computing device, and the like. However, such limiting of access serves as negative reinforcement that merely binds the younger individual's ability to use the computing device, and does not particularly influence studying or physical activity on the part of the younger individual.

Thus, what is desired is a system and method of providing positive reinforcement that rewards an individual's use of a computing device while also encouraging education, physical activity, or a combination thereof on the part of the individual.

SUMMARY

The various exemplary embodiments of the present invention include a system for enhancing and rewarding an individual's educational facility. The system is comprised of one or more computers; a timing means for determining an amount of time an individual has been accessing the one or more computers and comparing the amount of time to a predetermined period of time; an interrupting means for limiting or substantially ceasing use of the one or more computers by the individual until one or more predetermined tasks are achieved; an evaluating means for comparing the individual's ability to achieve the one or more predetermined tasks at a predetermined competency level, and for allowing continued use for the individual to the one or more computers for a second predetermined period of time if the individual achieves the one or more predetermined tasks at a predetermined competency level.

The various exemplary embodiments further include a method for enhancing and rewarding an individual's educational facility. The method is comprised of the steps of allowing an individual to access one or more computers; timing the individual to determine an amount of time an individual has been accessing the one or more computers and comparing the amount of time to a predetermined period of time; interrupting the individual's access to the one or more computers for a limited or substantially complete use of the one or more computers by the individual until one or more predetermined tasks are achieved; evaluating the individual's ability to achieve the one or more predetermined tasks in comparison to a predetermined competency level; and allowing continued use for the individual to the one or more computers for a second predetermined period of time if the individual achieves the one or more predetermined tasks at a predetermined competency level.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
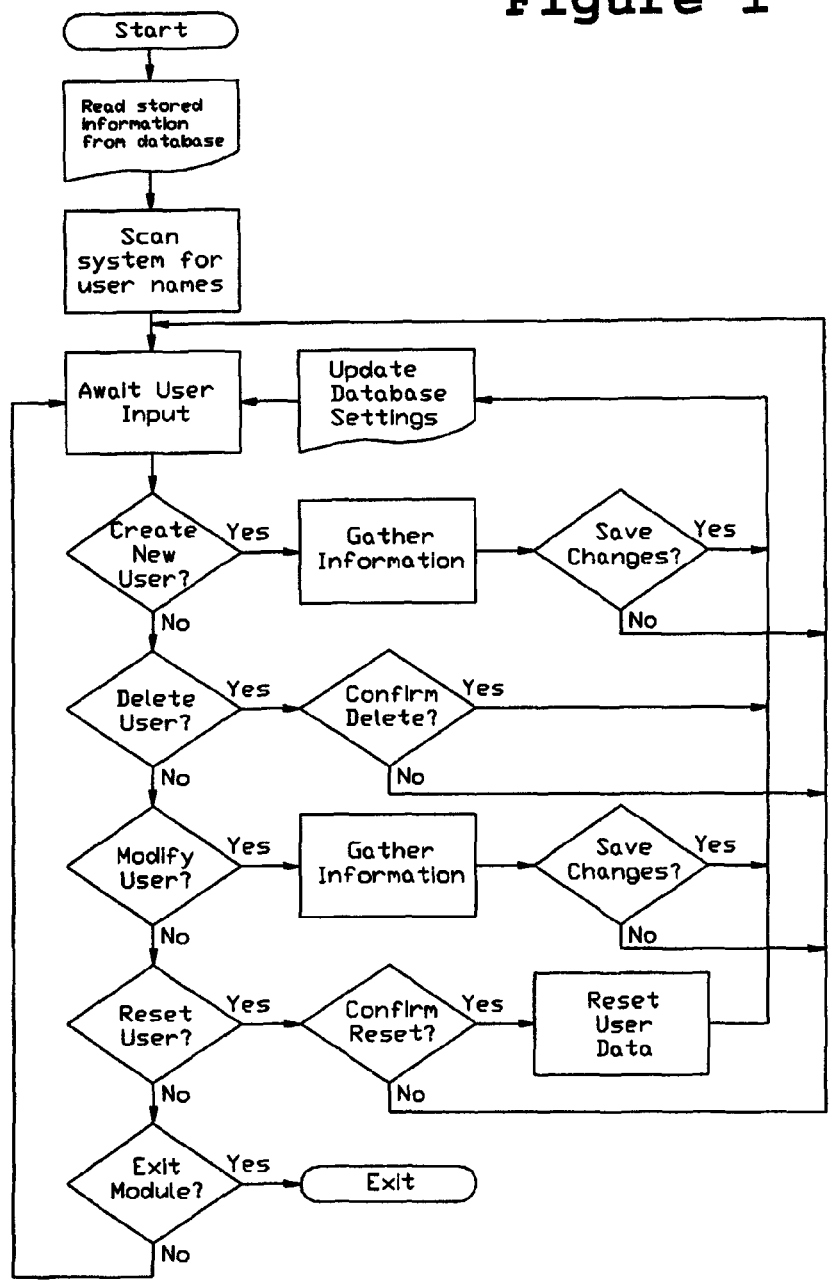
FIG. 1 is a flowchart of an exemplary embodiment of a management module of an exemplary embodiment of the present invention.
Figure 2:
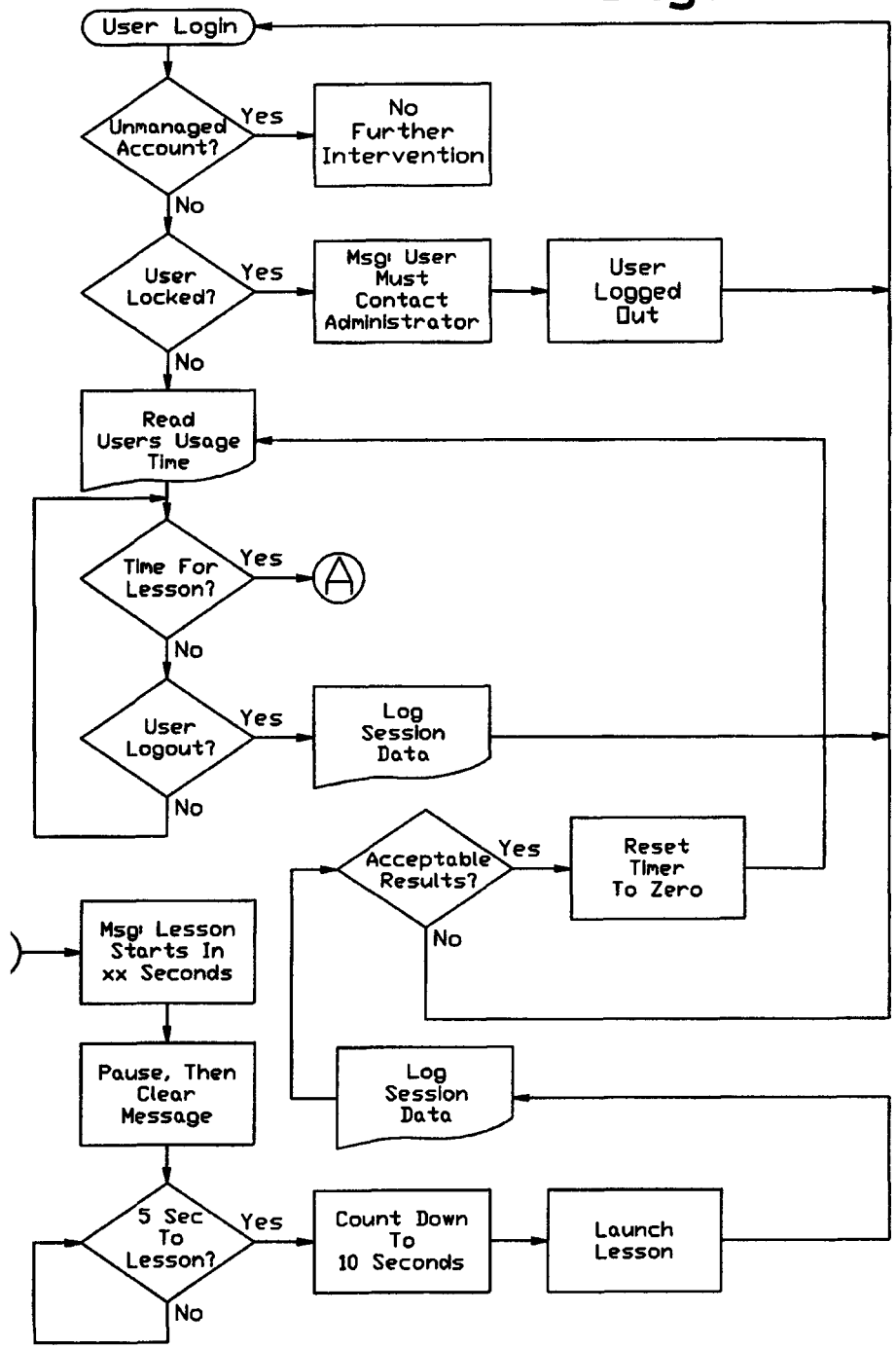
FIG. 2 is a flowchart of an exemplary embodiment of a monitoring module of an exemplary embodiment of the present invention.

Various exemplary embodiments of the present invention include a system for enhancing and rewarding an individual's educational facility. The system is comprised of one or more computers; a timing means for determining an amount of time an individual has been accessing the one or more computers and comparing the amount of time to a predetermined period of time; an interrupting means for limiting or substantially ceasing use of the one or more computers by the individual until one or more predetermined tasks are achieved; an evaluating means for comparing the individual's ability to achieve the one or more predetermined tasks at a predetermined competency level, and for allowing continued use for the individual to the one or more computers for a second predetermined period of time if the individual achieves the one or more predetermined tasks at a predetermined competency level.

The computer of the one or more computers may include, for example, a personal computer, a handheld electronic device, a gaming console, a mobile telephone, a personal music player, a video player, a television, and a combination thereof. The one or more computers may be networked to one or more other computers. The one or more computers are programmed, preferably by a software addition, to perform the exemplary embodiments herein.

The timing means is comprised of a timer for measuring the amount of time an individual has been accessing the one or more computers or a particular program on the one or more computers. Such timing means may be a portion of the memory, processing means, or other hardware or software of the one or more computers.

Once the individual has been accessing the one or more computers or particular program thereon for a predetermined period of time, the individual is provided limited or barred access to the one or more computers.

The predetermined period of time may be set or programmed by an individual having administrative rights or abilities to the one or more computers. The predetermined period of time can be set as a particular lapsed period of time, a random period of time, a segmented periods of time having either smaller or greater segments of time as the individual accesses the one or more computers, a period of time based on an individual's evaluation of previous tasks, or a combination thereof. The predetermined period of time may consistently shorten based on overall time an individual has been accessing the one or more computers.

The predetermined period of time may be changed at any time.

When the period of time for which an individual has been accessing the one or more computers is significantly equal to the predetermined period of time, the interrupting means limits or fully bars the individual from use of the one or more computers.

In an exemplary embodiment, a warning signal is provided to the individual at the predetermined time prior to the interrupting means limiting or barring access to the one or more computers.

The limited or fully barred access to the one or more computers continues until one or more predetermined tasks are achieved by the individual.

The one or more predetermined tasks may include, for example, a particular lapse of time of not using the one or more computers, responding to one or more questions, performing one or more physical activities, or a combination thereof.

The one or more predetermined tasks may be set or programmed by an individual having administrative rights or abilities on the one or more computers, or the tasks may be random in nature.

Such one or more predetermined tasks may be based on the individual's age, education level of the individual, educational ability on the part of the individual, physical fitness on the part of the individual; physical ability on the part of the individual; previous achievements of the one or more tasks by the individual, competency in one or more particular subjects or topics on the part of the individual, a user-defined subject matter and educational level, or a combination thereof.

The one or more tasks may be timed such that the individual must provide an answer or response within a predetermined answer time.

Upon completing the one or more predetermined tasks, the evaluating means compares the ability of the individual for the respective one or more tasks with a predetermined competency level for the same one or more tasks.

For example, if the one or more tasks required an individual to provide or input state capital cities upon a showing of a name of a respective state, the predetermined competency level may require that the individual properly and correctly provide at least sixty percent of the state capital cities upon a showing of the respective state.

If the one or more tasks are not completed successfully, a variety of settings can be used to define the next step. For example, individual having administrative rights or abilities may require a minimum of 80% completion of a task in order to allow the individual to continue. At a level below this point, again defined by the individual having administrative rights or abilities, the individual can be locked out of the computing device until further authorized by the individual having administrative rights or abilities.

If the individual achieves at least the predetermined competency level, access to the one or more computers is restored for the individual.

A report may be provided as well. Such report may identify previous achievements of the one or more predetermined tasks by the individual, overall time an individual has been accessing the one or more computers, suggestions for one or more predetermined tasks needing improvement, or a combination thereof. Such report may be provided electronically to the administrator when logging into the associated program. In other exemplary embodiments, the report may be emailed or otherwise electronically forwarded to the administrator at regularly-scheduled intervals of time or automatically upon actions taken by the individual.

In reference to FIG. 1 showing a flowchart of a management module of an exemplary embodiment of the present invention, the management module requires logging in at an administrative level account. The management module scans the one or more computers and compiles a list of pre-existing users/individuals and defined types of users. Each individual is preferably defined, for example, as either being "managed" or "unmanaged." Individuals identified as 'unmanaged' are unaffected by the operation of the present system and method.

For example, on a shared computer system, an individual having administrative rights and access may deem that a particular individual should not be encumbered by the present system and method. Therefore that account would be set to 'unmanaged'.

The individual having administrative rights and access, upon starting this module, has the option to create a new account, delete an account, change existing accounts setting (including switching between managed and unmanaged), or to reset an account. For example, if an individual is locked out for failing to complete a task, and the system may require that this particular task be completed before continuation; that individual would have to request that the individual having administrative rights and access reset their account.

Holidays, school years, school days, school hours, etc. may be input by the individual having administrative rights in order to allow for more or less computer usage by another individual based upon holidays from school, day of the week, time of day, etc.

Information for all of the managed accounts will be stored in a secured data file, preferably accessible only via the administrative rights, and via this module. The data file will preferably be encrypted to prevent a user from gaining access to the setup information, and perhaps make an attempt to thwart operation of the system.

The user interface component of this module serves to inform the individual having administrative rights and access with the user names, account types, and any alerts (such as attempts to thwart the system, tasks that have been completed and the grade point of those lessons), and the predetermined settings (e.g., frequency of interruption, interruption warning time constant, test type/weighting, required results of each test type, etc.), and in addition allowing the individual having the administrative rights and access to execute the above named functions that control operation of the system.

The subject matter to be used in association with particular predetermined tasks may be set so as to reinforce or emphasize a particular subject. Further, the frequency and randomness of the subject matter and/or predetermined tasks may be adjusted.

The individual with administrative rights may also provide positive reinforcement by creating and/or adjusting milestones for individuals using the system. Such milestones may include, for example, providing a certificate of achievement in a particular subject after a certain number or percentage of questions are correctly responded to. Other milestones may include, for example, providing awards, such as, for example, the ability to skip the next scheduled predetermined task, earning a "free pass" for a particular length of time, increasing the time until the next scheduled predetermined task, and the like.

During an initial installation, multiple background processes are created and set to auto-execute at startup of the one or more computers. The processes operate typically at all times, monitoring user activities, and determining if/when a task is started during operation of the one or more computers.

Such processes incorporate self-monitoring, to insure that an individual does not attempt to thwart operation of the system by shutting down these processes.

One background process, the monitor utility, will, during login of a managed user, determine first if the user is able to currently connect to the system. For example, the last test results resulted by parameter setting an individual lockout, then this process will prevent the individual from connecting until the individual having administrative rights or access is contacted and resets that individual.

In exemplary embodiments, when the individual is logged in, the monitor utility will gather the last time amount the individual was logged in without a lesson, this will be set as the current starting time for the individual session. The purpose is to prevent an individual from constantly logging out and back into the one or more computers in an attempt to keep their usage time below the required time interval.

The various exemplary embodiments of the present invention also include a method for enhancing and rewarding an individual's educational facility. The method is comprised of the steps of allowing an individual to access one or more computers; timing the individual to determine an amount of time an individual has been accessing the one or more computers and comparing the amount of time to a predetermined period of time; interrupting the individual's access to the one or more computers for a limited or substantially complete use of the one or more computers by the individual until one or more predetermined tasks are achieved; evaluating the individual's ability to achieve the one or more predetermined tasks in comparison to a predetermined competency level; and allowing continued use for the individual to the one or more computers for a second predetermined period of time if the individual achieves the one or more predetermined tasks at a predetermined competency level.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A system for enhancing and rewarding an individual's educational facility, the system being comprised of:

a first computer comprising a processor to execute a management module that is accessible to an administrator having administrative rights;

two or more computers that are each accessed by a managed user that does not have administrative rights, each of the two or more computers comprising a processor to execute one or more background processes including a monitor utility to configure each computer to determine an amount of time the managed user has been accessing the two or more computers in two or more sessions without achieving one or more predetermined tasks and comparing the amount of time to a predetermined period of time;

wherein the management module is in communication with the background processes of the two or more computers to:

determine an overall time the managed individual has been accessing the two or more computers;

limit or substantially cease use of the two or more computers by the managed individual until one or more predetermined tasks are achieved; and compare the individual's ability to achieve the one or more predetermined tasks at a predetermined competency level and at a predetermined task completion level;

determine the individual's achievement of predetermined milestones;

allow continued use for the individual to the two or more computers for a second predetermined period of time if the individual achieves the one or more predetermined tasks at the predetermined competency level;

administer of one or more system settings selected from the group consisting of tasks and any associated variables, milestones and any associated variables, any associated time variables, competency level, completion level, rewards, and combinations thereof;

wherein the system provides for one or more rewards for individuals upon achieving one or more predetermined milestone;

wherein the one or more predetermined tasks are selected from the group consisting of one or more questions, one or more physical activities, and combinations thereof;

wherein the one or more selected tasks are adjusted based on one or more factors selected from the group consisting of the individual's age, educational level, educational ability, previous achievements of the one or more predetermined tasks, competency in one or more particular subjects, user-defined subject and level, and combinations thereof;

wherein the one or more predetermined tasks are adjusted based on the individual's performance;

wherein the limiting or substantially ceasing use of the two or more computers continues until one or more predetermined tasks are achieved by the individual;

wherein the second predetermined period of time decreases if the individual achieves the one or more predetermined tasks at a percentage less than the predetermined competency level; and wherein the awards are selected from the group consisting of certificates of achievement, awards, ability to skip the next scheduled predetermined task, earning time, increasing the time until the next scheduled task, and combinations thereof.

2. The system according to claim 1, wherein the two or more computers are two different types selected from the group consisting of personal computer, networked computer, handheld electronic device, gaming consoles, mobile telephone, personal music player, video player, television, and a combination thereof.

3. The system according to claim 2, wherein the one or more selected tasks are selected to emphasize competency in one or more particular subjects, user-defined subjects, and combinations thereof.

4. The system according to claim 3, wherein the one or more background processes incorporate self-monitoring of the two or more computers to insure that an individual does not attempt to thwart operation of the system.

5. The system according to claim 4, further comprising a warning signal provided to the individual at a predetermined time prior to ceasing use of the two or more computers.

6. The system according to claim 5, wherein the predetermined period of time is random or consistently shortens based on overall time an individual has been accessing the two or more computers.

7. The system according to claim 6, wherein administering of one or more predetermined tasks provides for adjusting of one or more variables selected from the group consisting of frequency of interruption, interruption warning time constant, task type, task weighting, and required results of each task type.

8. The system according to claim 7, further comprising a report identifying previous achievements of the one or more predetermined tasks by the individual, overall time an individual has been accessing the two or more computers, suggestions for one or more predetermined tasks needing improvement, or a combination thereof.

9. The system according to claim 8, wherein the management module is in communication with the background processes of the two or more computers to allow access to the two or more computers after a predetermined interruption period of time.

10. The system according to claim 9, wherein the predetermined competency level is at least 70%.

11. A method for enhancing and rewarding an individual's educational facility, the method comprising:
 a management module that is accessible to an administrator having administrative rights:
  allowing a managed user that does not have administrative rights to access two or more computers;
  timing the managed user to determine an amount of time an individual has been accessing the two or more computers in two or more sessions without achieving one or more predetermined tasks and comparing the amount of time to a predetermined period of time;
  determining an overall time the managed individual has been accessing the two or more computers;
  interrupting access to the two or more computers for a limited or substantially complete use of the two or more computers by the managed user until one or more predetermined tasks are achieved;
  evaluating the individual's ability to achieve the one or more predetermined tasks in comparison to a predetermined competency level; and
  allowing continued use for the individual to the two or more computers for a second predetermined period of time if the individual achieves the one or more predetermined tasks at the predetermined competency level.

12. The method according to claim 11, wherein the two or more computers are two different types selected from the group consisting of personal computer, network computer, handheld electronic device, gaming consoles, mobile telephone, personal music player, video player, television, and a combination thereof.

13. The method according to claim 12, wherein the one or more predetermined tasks are selected from the group consisting of one or more questions, one or more physical activities, and a combination thereof.

14. The method according to claim 13, wherein the one or more predetermined tasks are based on the individual's age, educational level, educational ability, previous achievements of the one or more predetermined tasks, competency in one or more particular subjects, user-defined subject and level, or a combination thereof.

15. The method according to claim 14, further comprising providing a warning signal to the individual at a predetermined time prior to the interrupting means ceasing use of the two or more computers.

16. The method according to claim 15, wherein the predetermined period of time is random or consistently shortens based on overall time an individual has been accessing the two or more computers.

17. The method according to claim 16, wherein the individual having administrative rights via the management module can cause in the two or more computers alteration of the one or more predetermined tasks and any associated variables, the predetermined period of time, the predetermined competency level, or a combination thereof.

18. The method according to claim 17, further comprising reporting previous achievements of the one or more predetermined tasks by the individual, overall time an individual has been accessing the two or more computers, suggestions for one or more predetermined tasks needing improvement, or a combination thereof.

19. The method according to claim 18, further comprising allowing access to the two or more computers after a predetermined interruption period of time.

20. The method according to claim 19, wherein the predetermined competency level is at least 70%.

21. A system for enhancing and rewarding an individual's educational facility, the system being comprised of:
 a first computer comprising a processor to execute a management module that is accessible to an administrator having administrative rights;
 two or more computers that are each accessed by a managed user that does not have administrative rights, each of the two or more computers comprising a processor to execute one or more background processes including a monitor utility to configure each computer to determine an amount of time the managed user has been accessing the two or more computers in two or more sessions without achieving a predetermined tasks and comparing the amount of time to a predetermined period of time;
 wherein the management module is in communication with the background processes of the two or more computers to:
  determine an overall time the managed individual has been accessing the two or more computers;
  limit or substantially cease use of the two or more computers by the managed individual until one or more predetermined tasks are achieved; and
  compare the individual's ability to achieve the one or more predetermined tasks at a predetermined competency level, and for allow continued use for the managed user of the two or more computers for a second predetermined period of time if the individual achieves the one or more predetermined tasks at a predetermined competency level.

22. The system of claim 21, wherein the one or more background processes incorporate self-monitoring of the two or more computers that prevent the managed individual from shutting down the monitor utility.

23. The system of claim 21, wherein the management module scans the two or more computer to identify a managed account of the managed user and stores information regarding the managed account in a secured data file.

24. The system of claim 21, wherein the two or more computers are two different types selected from the group consisting of personal computer, network computer, handheld electronic device, gaming consoles, mobile telephone, personal music player, video player, television, and a combination thereof.

25. The system of claim 21, wherein:
the first computer and the two or more computers are networked together for the management module to communicate a limit or barred access to the one or more background processes of all of the two or more computers.

26. The system of claim 25, wherein:
in response to a login by the managed user, a background process on a select one of the two or computers determines whether the managed user has an individual lockout until reset by the management module of the first computer.

* * * * *